US008239925B2

(12) United States Patent
Faitelson et al.

(10) Patent No.: US 8,239,925 B2
(45) Date of Patent: Aug. 7, 2012

(54) EVALUATING REMOVAL OF ACCESS PERMISSIONS

(75) Inventors: Yakov Faitelson, Elkana (IL); Ohad Korkus, Tel-Aviv (IL); Ophir Kretzer, Reut (IL)

(73) Assignee: Varonis Systems, Inc., New York, NY (US)

( * ) Notice: Subject to any disclaimer, the term of this patent is extended or adjusted under 35 U.S.C. 154(b) by 1124 days.

(21) Appl. No.: 11/789,884

(22) Filed: Apr. 26, 2007

(65) Prior Publication Data

US 2008/0271157 A1     Oct. 30, 2008

(51) Int. Cl.
*G06F 21/24* (2006.01)
*G06F 21/00* (2006.01)

(52) U.S. Cl. ............. 726/6; 726/1; 726/2; 726/3; 726/4; 726/5; 707/751

(58) Field of Classification Search .................. 726/1–4, 726/21, 26–30
See application file for complete search history.

(56) References Cited

U.S. PATENT DOCUMENTS

| 5,465,387 | A | 11/1995 | Mukherjee |
| 7,031,984 | B2 | 4/2006 | Kawamura et al. |
| 7,068,592 | B1 | 6/2006 | Duvaut et al. |
| 7,716,240 | B2 * | 5/2010 | Lim ............................. 707/781 |
| 2003/0048301 | A1 | 3/2003 | Menninger |
| 2003/0051026 | A1 | 3/2003 | Carter et al. |
| 2003/0231207 | A1 | 12/2003 | Huang |
| 2004/0249847 | A1 | 12/2004 | Wang et al. |
| 2005/0065823 | A1 | 3/2005 | Ramraj et al. |
| 2005/0086529 | A1 | 4/2005 | Buchsbaum |
| 2005/0203881 | A1 | 9/2005 | Sakamoto et al. |
| 2005/0246762 | A1 * | 11/2005 | Girouard et al. .................. 726/2 |
| 2005/0278785 | A1 | 12/2005 | Lieberman |
| 2006/0184459 | A1 | 8/2006 | Parida |
| 2006/0277184 | A1 | 12/2006 | Faitelson et al. |
| 2007/0033340 | A1 | 2/2007 | Tulskie et al. |
| 2007/0061487 | A1 | 3/2007 | Moore et al. |
| 2007/0156693 | A1 * | 7/2007 | Soin et al. ......................... 707/9 |

(Continued)

FOREIGN PATENT DOCUMENTS

CN          1588889 A        3/2005

OTHER PUBLICATIONS

U.S. Appl. No. 11/786,522, filed Apr. 12, 2007, Faitelson, et al.

(Continued)

*Primary Examiner* — Jeffrey D Popham
*Assistant Examiner* — Alexander Lagor
(74) *Attorney, Agent, or Firm* — Weingarten, Schurgin, Gagnebin & Lebovici LLP

(57) ABSTRACT

Methods and systems are provided for controlling access to a file system. A record of actual accesses by users of the file system is maintained. Before a user is removed from a set of users or before a privilege for a set of users to access a data element is removed, it is determined whether the actual recorded accesses of the user are allowed by residual access permissions that would remain after implementing the proposed removal of access permission. An error condition is generated if the proposed removal of the access permission would have prevented at least one of the actual accesses. In another aspect of the invention, the system determines if the users would have alternate access to the storage element following implementation of the proposal.

7 Claims, 7 Drawing Sheets

U.S. PATENT DOCUMENTS

| | | | |
|---|---|---|---|
| 2007/0198608 A1 | 8/2007 | Prahlad et al. | |
| 2007/0203872 A1 | 8/2007 | Flinn et al. | |
| 2007/0244899 A1 | 10/2007 | Faitelson et al. | |
| 2007/0261121 A1 | 11/2007 | Jacobson | |
| 2007/0266006 A1* | 11/2007 | Buss | 707/3 |
| 2007/0276823 A1 | 11/2007 | Borden et al. | |
| 2008/0031447 A1 | 2/2008 | Geshwind et al. | |

OTHER PUBLICATIONS

U.S. Appl. No. 60/688,486, filed Jun. 7, 2005, Faitelson.

Sara C. Madeira and Arlindo L. Oliveira; Biclustering Algorithms for Biological data Analysis: A Survey; Mar. 2004; http://www.cs.princeton.edu/courses/archive/spr05/cos598E/bib/bicluster.pdf.

Sara C. Madeira; Clustering, Fuzzy Clustering and Biclustering: An Overview; p. 31 to 53, Jun. 27, 2003.

An International Search Report and a Written Opinion both dated Jun. 14, 2011 which issued during the prosecution of Applicant's PCT/IL11/00066.

An International Search Report and a Written Opinion both dated Jun. 13, 2011 which issued during the prosecution of Applicant's PCT/IL11/00076.

An International Search Report and a Written Opinion both dated May 24, 2011 which issued during the prosecution of Applicant's PCT/IL11/00077.

"Secure Access Control in a Multi-user Geodatabase", Sahadeb De et al., availavle on the Internet at the URL http://www10.giscafe.com, Jul. 8-12, 2002.

* cited by examiner

EVALUATING REMOVAL OF ACCESS PERMISSIONS

BACKGROUND OF THE INVENTION

1. Field of the Invention

This invention relates to computer security. More particularly, this invention relates to modification of user access permissions on a computer system.

2. Description of the Related Art

Data security policies typically determine who has access to an organization's stored data on various computer systems. These policies are rarely static. Users from within the organization, e.g., employees, partners, contractors, can pose a threat as severe as threats from outside the organization. Thus, as the structure and personnel makeup of the organization change, the security policy should be adjusted from time to time. Yet, information technology (IT) departments often find it difficult to manage user access rights and to ensure that needed information is conveniently available, while still protecting the organization's sensitive data.

Current techniques available to IT personnel include review and maintenance of access control lists, in conjunction with administration of user names, passwords, and the extension of such techniques to include biometrics, encryption, and limitation of access to a single sign-on. Such techniques are inefficient, often inaccurate, and become impractical in the context of large, complex organizations whose structure and personnel are constantly changing.

SUMMARY OF THE INVENTION

According to disclosed embodiments of the invention, methods and systems are provided for validation of removal of user access permissions within the scope of a file security policy. Specifically, proposed removals of users from groups with data access are validated, prior to actual implementation, by determining that the users do not have alternative means of accessing the same data through other groups, and by determining that historical user accesses would still be allowable by the proposed residual access rights. This reduces the risk of needed data being denied to a user or class of users, an event that would risk disruption to the work of the organization. The principles of the invention are applicable to networked organizations having diverse access control models and file server protocols.

In some embodiments, the historical information is acquired automatically as part of a data security model, in which access to storage elements within the organizational network is continually monitored and analyzed by an access control system. The system monitors access to storage elements within the network, and stores the information in a database. Periodically, an aggregated table is produced from the log table. The aggregated table indicates which users accessed which storage elements, without duplicate entries. It is therefore possible to search this table efficiently to determine whether a specified user accessed a specified storage element.

For every user for whom removal from a subject user group is proposed, the system verifies that no other user groups of which the user is a member have access to any data, which the user can currently access by virtue of its membership in the subject user group. If such an alternative means of accessing data is available, the details are reported to an operator, such as a system administrator. Embodiments of the invention further use the aggregated table to verify that, for every user for whom removal from a user group is proposed, all actual accesses of storage elements by the user are allowed by residual access permissions that would remain after implementation of the proposal. Any historical data access by an affected user that is no longer allowed by its residual access rights is categorized as an error, which is reported to the operator. The error may nevertheless be overridden by the administrator, who may know that the user does not need access to the storage element.

An embodiment of the invention provides a computer-implemented method for controlling access to a file system that has storage elements, which is carried out by maintaining a record of respective actual accesses by users of the file system to the storage elements, and defining a proposed removal of a set of the users from a superset of the users, wherein members of the superset have common access privileges to a portion of the storage elements. Following an implementation of the proposed removal, members of the set would retain respective residual access permissions to the storage elements. The method is further carried out by automatically determining, prior to the implementation of the proposed removal, that at least one of the respective actual accesses is disallowed to the members of the set by the respective proposed residual access permissions, and thereupon generating a report or error indication.

According to an additional aspect of the method, the users have memberships in respective alternative user groups. Each of the alternative user groups has group permissions to access respective portions of the storage elements, and the respective residual access permissions of the users comprise the group permissions of the alternative user groups.

In one aspect of the method. The record is maintained by constructing an aggregated table of unique actual accesses by the users.

In yet another aspect of the method, the removal of the user from the user group is proposed automatically.

Another aspect of the method includes automatically establishing that the respective proposed residual access permissions allow at least one of the members of the set associated therewith to access one of the storage elements in the portion and responsively thereto generating another report or error indication.

Other embodiments of the invention provide computer software product and apparatus for performing the method.

An embodiment of the invention provides a computer-implemented method for controlling access by users of a file system that has storage elements, which is carried out by defining a proposed removal of a set of the users from a superset of the users, wherein members of the superset have common access privileges to a portion of the storage elements, and wherein following an implementation of the proposed removal, members of the set retain respective proposed residual access permissions to the storage elements. The method is further carried out by automatically determining that the respective proposed residual access permissions allow at least one of the members of the set to access one of the storage elements in the portion, and thereupon generating a report or an error indication.

An embodiment of the invention provides a computer-implemented method for controlling access to a file system has storage elements, which is carried out by maintaining a record of respective actual accesses by users of the file system to the storage elements, defining a proposed removal of a right to access a designated storage element by a set of the users wherein members of the set have common access privileges to at least the designated storage element, and wherein following an implementation of the proposed removal, the members of the set retain respective proposed residual access permissions to the storage elements. The method is further carried out by automatically determining, prior to the implementation of the proposed removal, that at least one of the respective actual accesses are disallowed to the members of the set by the respective proposed residual access permissions, responsively thereto, generating an error indication.

An aspect of the method includes automatically establishing that the respective proposed residual access permissions allow at least one of the members of the set associated therewith to access the designated storage element and responsively thereto generating another error indication.

Other embodiments of the invention provide computer software product and apparatus for performing the methods.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

System Overview.

Figure 1:
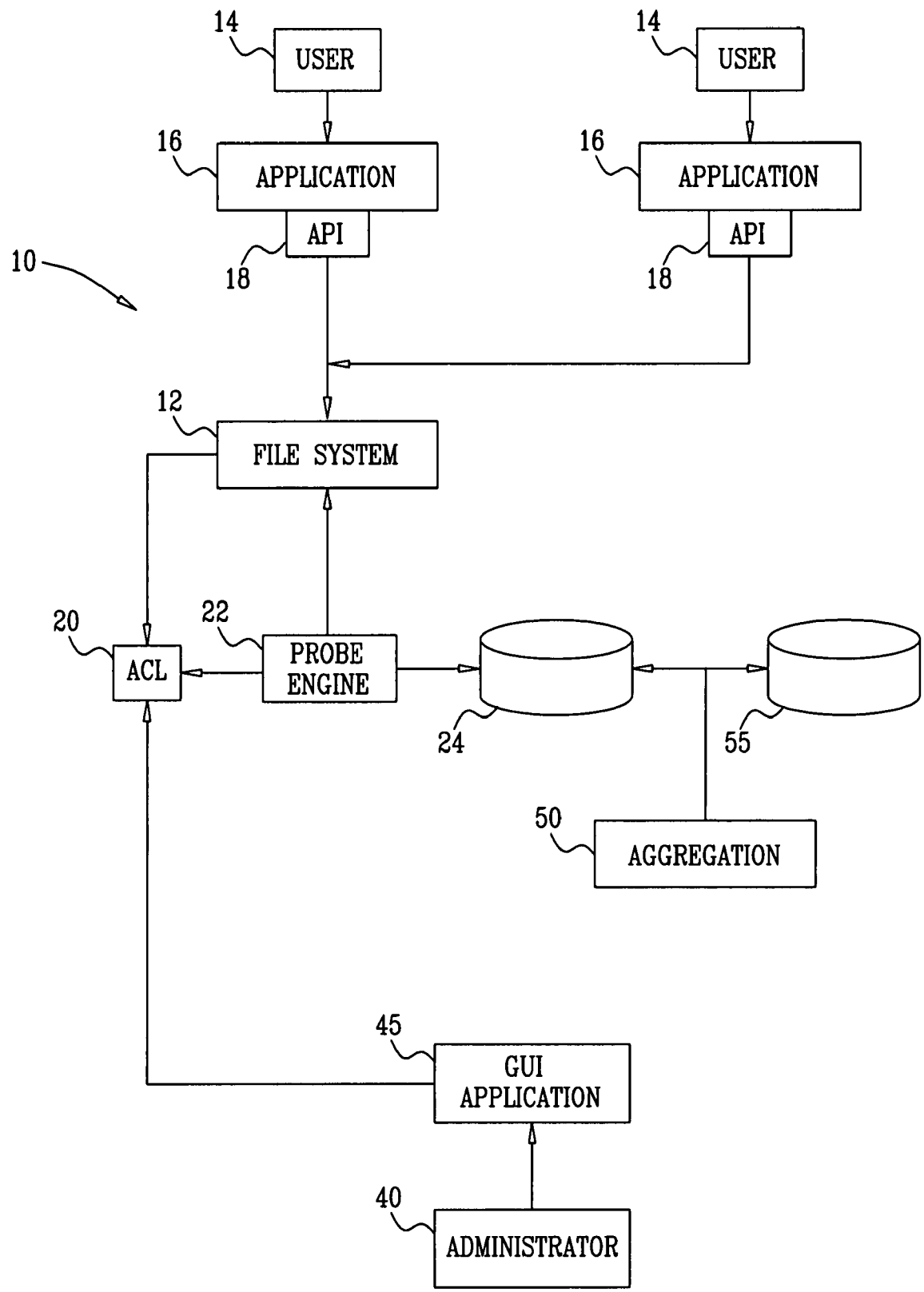
FIG. 1 is a block diagram of a data processing system, wherein proposals for data access control policies are automatically verified, in accordance with a disclosed embodiment of the invention.

Turning now to the drawings, reference is initially made to FIG. 1, which is a block diagram of a data processing system 10, wherein proposals for data access control policies are automatically verified, in accordance with a disclosed embodiment of the invention. The system 10 may be implemented as a general purpose processor or computer or a plurality of computers linked together in a network, for example the Internet. Using the facilities of the system 10, data access control policies can be automatically established using the methods disclosed in commonly assigned U.S. Patent Application Publication No. 2006/0277184, which is herein incorporated by reference. Although the system 10 is shown as comprising a number of separate functional blocks, these blocks are not necessarily separate physical entities, but rather represent different computing tasks or data objects stored in a memory that is accessible to the computer. These tasks may be carried out in software running on a single processor, or on multiple processors. The software may be provided to the processor or processors on tangible media, such as CD-ROM or non-volatile memory. Alternatively or additionally, the system 10 may comprise a digital signal processor or hard-wired logic.

Organization-wide data storage accessible by the system 10 is represented by an organizational file system 12. The organizational file system 12 may comprise one or more colocated storage units, or may be a geographically distributed data storage system, as is known in the art. There is no requirement that individual storage units of the organizational file system 12 have the same capabilities.

The organizational file system 12 may be accessed by any number of users 14 using one or more applications 16, which communicate with the organizational file system 12 using an application programming interface 18 (API). The users 14 are typically members of the organization, but may also include outsiders, such as customers.

The organizational file system 12 verifies that the users 14 have access to the data requested using an access control list 20 (ACL). The ACL can be viewed as a set of pairs, where each pair consists of a user group and a group of data elements that can be accessed by the user group. A user group consists of users and/or other user groups. The users and user groups within any user group are also listed in the ACL.

The organizational file system 12 typically comprises files and directories in a hierarchical structure in which the files and directories contained in a directory may be viewed as being below the containing directory.

A probe engine 22 is designed to collect access information from the organizational file system 12 in an ongoing manner and store the resulting information stream in a log file 24. In some embodiments, the probe engine 22 may also be utilized to collect the organization's current file security policy, the current structure of the organizational file system 12, and information about the users 14. The probe engine 22 can be implemented in various environments and architectures.

In some embodiments, an analysis engine (not shown) may analyze the data in the log file 24 to automatically propose and revise the organization's security policy as described in U.S. Patent Application Publication No. 2006/0277184, cited above.

A sufficiently qualified user, e.g., an administrator 40, can view changes recommended by the system 10. Alternatively, the administrator 40 may consider specific removals of user access permissions. Before applying the changes, the administrator 40 uses a GUI (Graphical User Interface) application 45 to verify the proposed changes. In particular, the GUI application 45 verifies that all the data accesses in the log file 24 would still be possible after the proposed changes have been performed. If any of the proposed changes would prevent a data access in the log file, the proposed change is categorized as invalid, although the administrator 40 may still override this.

An aggregation module 50 produces an aggregated table 55 from data in the log file 24. Typically, this is performed daily. Alternatively, it may be performed on demand.

Figure 2:
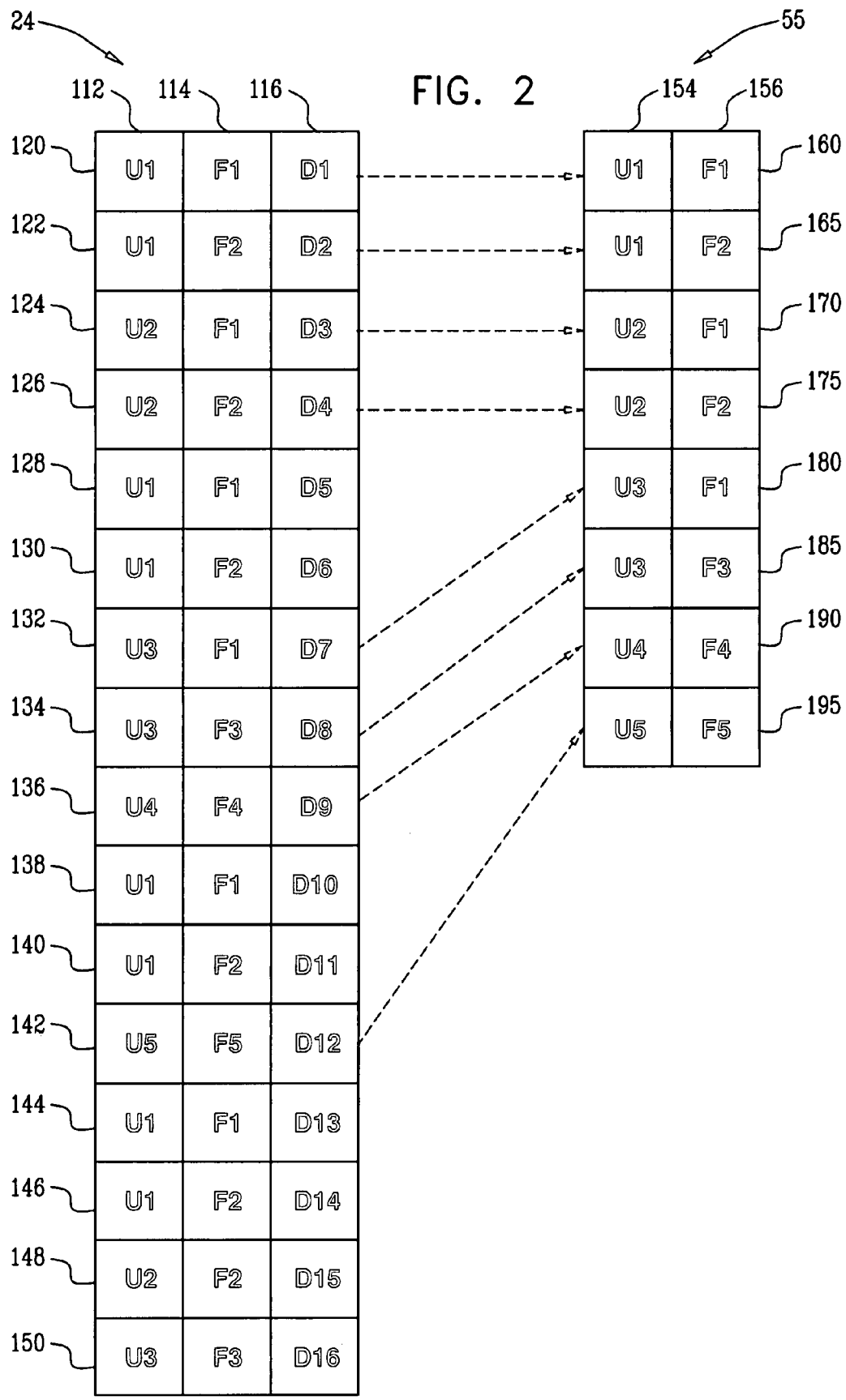
FIG. 2 is a diagram illustrating exemplary construction of an aggregated table from a log file, in accordance with a disclosed embodiment of the invention.

Reference is now made to FIG. 2, which is a diagram illustrating exemplary construction of the aggregated table 55 from the log file 24, in accordance with a disclosed embodiment of the invention.

The log file 24 comprises a sequence of log entries. Each log entry is constructed when a user accesses a data element in the organizational file system 12 (FIG. 1), and comprises the following fields. Typically, a data element may be a file, a directory, or a directory together with all files and directories below it in the hierarchical structure of the organizational file system 12 (FIG. 1):

a field 112 references the name of the user that accessed the data;

a field 114 references the name of the data that was accessed by the user; and a field 116 references the date and time that the user accessed the data.

The log file 24 shown comprises log entries 120, 122, 124, 126, 128, 130, 132, 134, 136, 138, 140, 142, 144, 146, 148 and 150. For example, the log entry 120 comprises fields 112=U1, 114=F1, 116=D1.

The aggregated table 55 comprises a sequence of table entries. Each table entry is a condensed form of one or more corresponding log entries of the table 24 and comprises the following fields:

a field 154 contains a copy of the field 112; and a field 156 contains a copy of the field 114.

The aggregated table 55 does not contain duplicated entries. A table entry 160 is derived from the log entry 120. A table entry 165 is derived from the log entry 122. A table entry 170 is derived from the log entry 124. A table entry 175 is derived from the log entry 126.

No table entry is derived from the log entry 128, since such a table entry would match the table entry 160. No table entry is derived from the log entry 130, since such a table entry would match the table entry 165.

A table entry 180 is derived from the log entry 132. A table entry 185 is derived from the log entry 134. A table entry 190 is derived from the log entry 136.

No table entry is derived from the log entry 138, since such a table entry would match the table entry 160. No table entry is derived from the log entry 140, since such a table entry would match the table entry 165.

A table entry 195 is derived from the log entry 142.

No table entry is derived from the log entry 144, since such a table entry would match the table entry 160. No table entry is derived from the log entry 146, since such a table entry would match the table entry 165. No table entry is derived from the log entry 148, since such a table entry would match the table entry 175. No table entry is derived from the log entry 150, since such a table entry would match the table entry 185.

Figure 3:
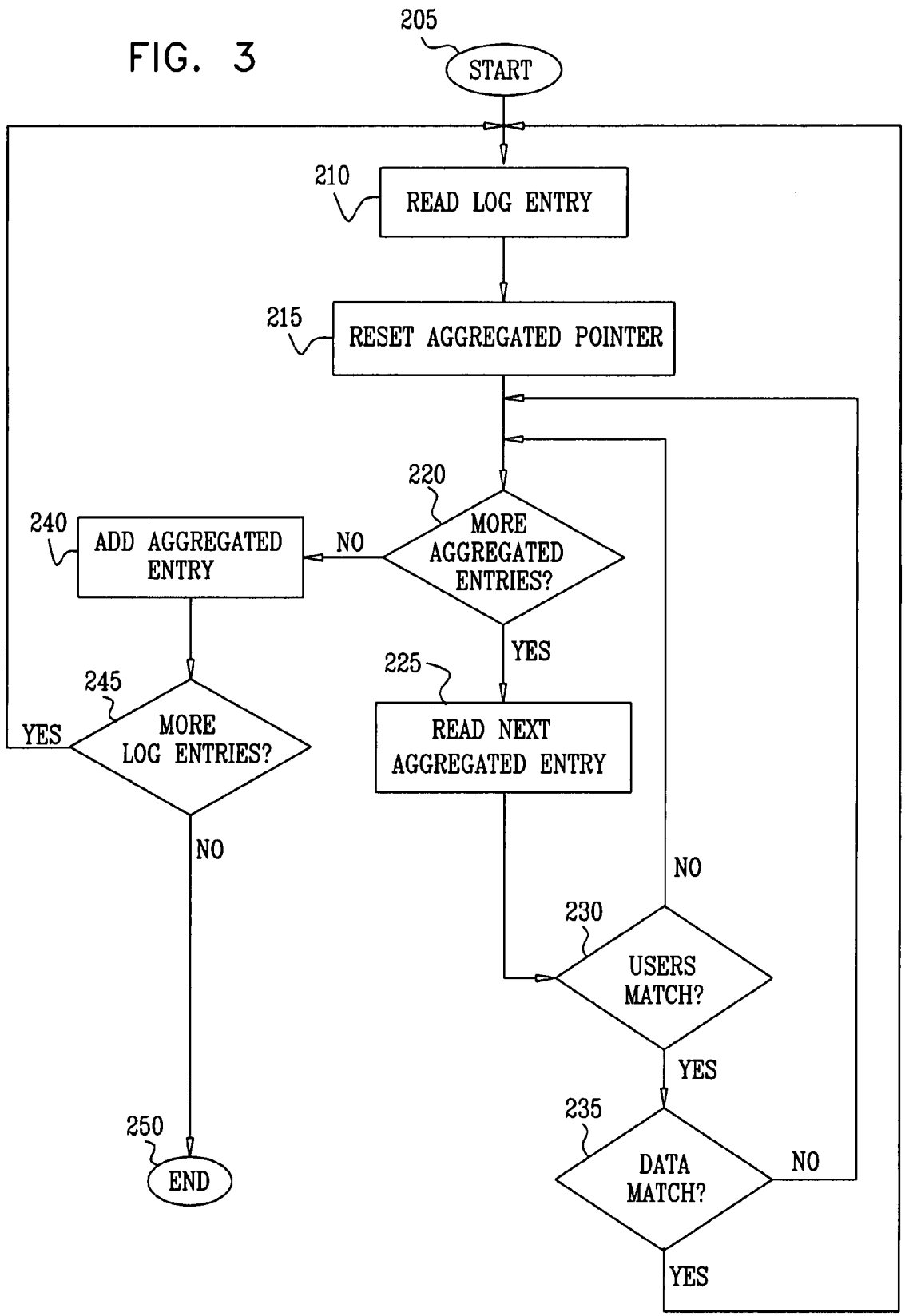
FIG. 3 is a flow chart illustrating the procedure of FIG. 2, in accordance with a disclosed embodiment of the invention.

Reference is now made to FIG. 3, which is a flow chart illustrating the procedure of FIG. 2, in accordance with a disclosed embodiment of the invention. By way of example and not limitation, the method is described hereinbelow with reference to the aggregated table 55 shown in FIG. 2.

Control begins at initial step 205, and proceeds to step 210. A log entry 110 (FIG. 2) is read from the log file 24 (FIG. 1).

Next, at step 215, the aggregated table 55 (FIG. 2) is reset, so that the next table entry 152 (FIG. 2) to be read will be the first.

Next, at decision step 220, it is determined whether there are any more table entries 152 (FIG. 2) in the aggregated table 55 (FIG. 2) to check against the current log entry 110 (FIG. 2).

If the determination at decision step 220 is affirmative, control proceeds to step 225. The next table entry 152 (FIG. 2) is read from the aggregated table 55 (FIG. 2).

Next, at decision step 230, it is determined whether the field 112 (FIG. 2) in the current log entry 110 (FIG. 2) matches the field 154 (FIG. 2) in the current table entry 152 (FIG. 2).

If the determination at decision step 230 is negative, control returns to decision step 220.

If the determination at decision step 230 is affirmative, control proceeds to decision step 235. It is determined whether the field 114 (FIG. 2) in the current log entry 110 (FIG. 2) matches the field 156 (FIG. 2) in the current table entry 152 (FIG. 2).

If the determination at decision step 235 is negative, control returns to decision step 220.

If the determination at decision step 235 is affirmative, control returns to step 210.

If the determination at decision step 220 is negative, control proceeds to step 240. A new table entry 152 (FIG. 2) is created, derived from the current log entry 110 (FIG. 2), and added to the aggregated table 55 (FIG. 2).

Next, at decision step 245, it is determined whether there are any more log entries 110 (FIG. 2) to check. If the determination at decision step 245 is affirmative, control returns to step 210.

If the determination at decision step 245 is negative, control proceeds to a final step 250 and the procedure terminates.

Operation.

The following description discloses operations in which proposed removals of users from user groups are automatically evaluated. Such user groups are accorded respective common access privileges to data elements. It should be noted that a user may itself be a user group. Furthermore, a user group from which it is proposed to remove a user may be a constituent of other user groups. Thus, such proposals are treated as removal of a set of users from a superset of users. Accordingly, the methods that are disclosed below are performed iteratively and recursively.

Figure 4:
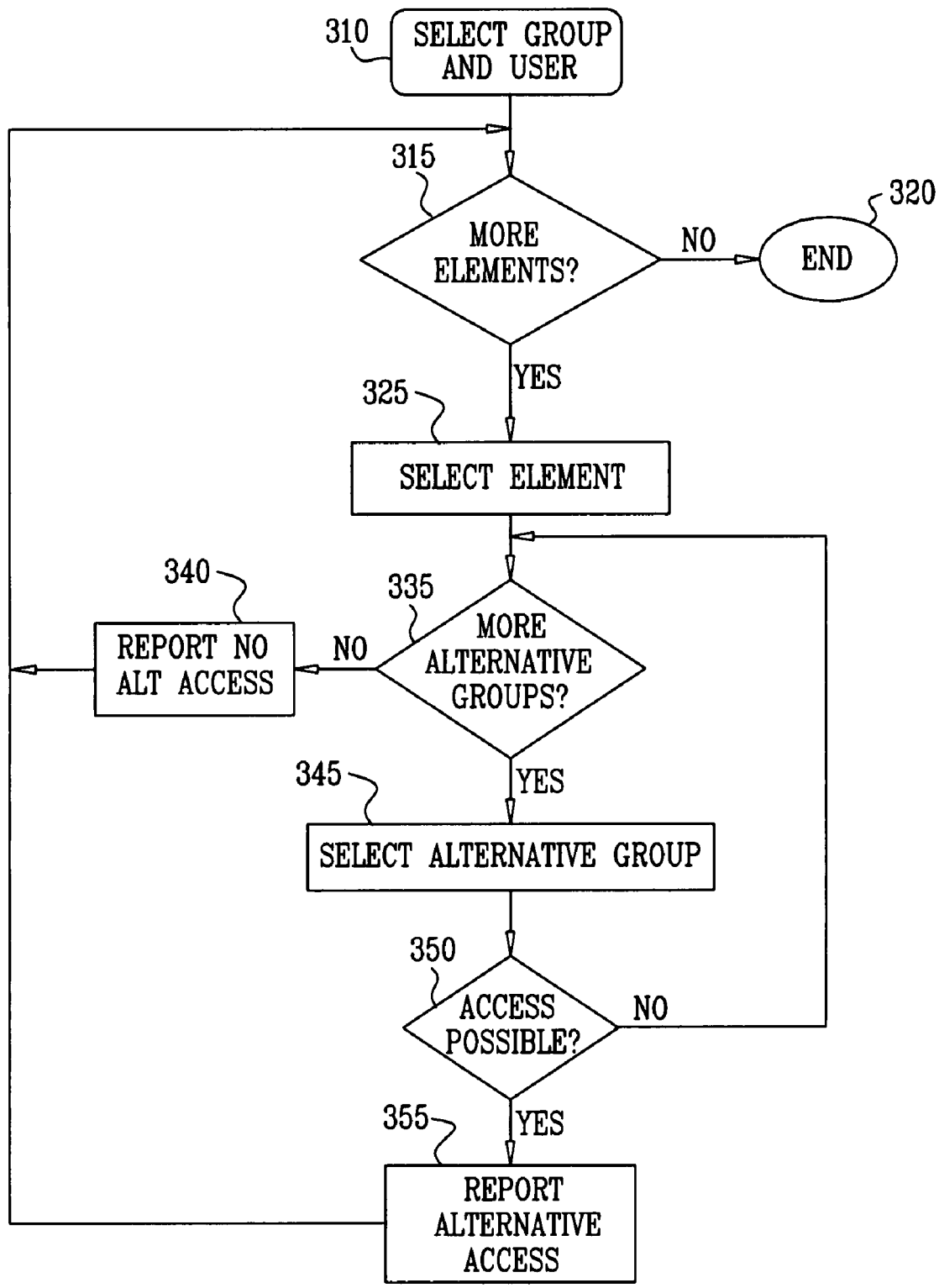
FIG. 4 is a flow chart of a method for verifying the effectiveness of a proposed removal of a user from a user group, in accordance with a disclosed embodiment of the invention.

Reference is now made to FIG. 4, which is a flow chart of a method for verifying the effectiveness of a proposed removal of a user from a user group, in accordance with a disclosed embodiment of the invention. The steps of the method are shown in an exemplary sequence in FIG. 4 for clarity of presentation. However, it will be evident to those skilled in the art that many of them can be performed in parallel, asynchronously, or in different orders. While the method is sometimes disclosed with reference to FIG. 1, this is merely for clarity. The method is applicable to many system configured other than the embodiment of FIG. 1. For example, systems that do not employ GUI applications or access control lists.

Referring again to FIG. 1, the administrator 40 uses the GUI application 45 to specify a set of proposed removals of users from a user group.

In the sequence explained below, the administrator 40 selects a containing user group. The portion of the data elements in the file system to which the user group has access are displayed, as well as the users and user groups in the containing user group. The administrator 40 selects a displayed user or user group to propose removing the selected user or user group from the containing user group.

The above steps may be repeated, allowing the administrator 40 to propose multiple removals of users from user groups.

The GUI application 45 scans the proposed removals of users and user groups from user groups.

Referring again to FIG. 4, at initial step 310, a user group, and a user proposed to be removed from that user group are selected.

Next, at decision step 315, it is determined whether there are any more data elements to which members of the current user group have access. Normally, the determination in the first iteration of step 315 is affirmative. In the embodiment of FIG. 1, decision step 315 can be performed by scanning the ACL 20.

If the determination at decision step 315 is negative, control proceeds to final step 320, and the procedure terminates. A report is provided to the operator, which indicates the status of the proposed residual access privileges of the user with respect to the data elements that were evaluated, as described below.

If the determination at decision step 315 is affirmative, control proceeds to step 325. A data element to which members of the selected user group have access is selected. It will be evident from inspection of FIG. 4 that step 325 is performed iteratively, and the data elements for the current user group are evaluated cyclically. However, the order of evaluation among the data elements in a cycle is not critical.

Next, at decision step 335, it is determined whether it is necessary to process alternative groups of which the selected user is a member, besides the group selected at step 310.

If the determination at decision step 335 is negative, control proceeds to step 340, where an indication that no alternative access is possible with respect to the current data element is stored or reported to the operator. Control then returns to decision step 315.

If the determination at decision step 335 is affirmative, control proceeds to step 345. An alternative group of which the selected user is a member is selected. Step 345 is performed iteratively, and the alternative user groups are evaluated cyclically. However, the order of evaluation in a cycle is not critical.

Next, at decision step 350, it is determined whether members of the current alternative group have access to the selected data element.

If the determination at decision step 350 is affirmative, control proceeds to step 355. It is concluded that following implementation of the proposal, the user would retain alternative access to the current data element that is accessible by the selected user group. An indication of this fact, for example an error indication, is provided to the operator, and details may be stored for subsequent reporting, e.g., current group, user, data element and alternative group may be reported. Control then returns to decision step 315 and the procedure repeated by considering the remaining data elements that are accessible by the selected user group.

Figure 5:
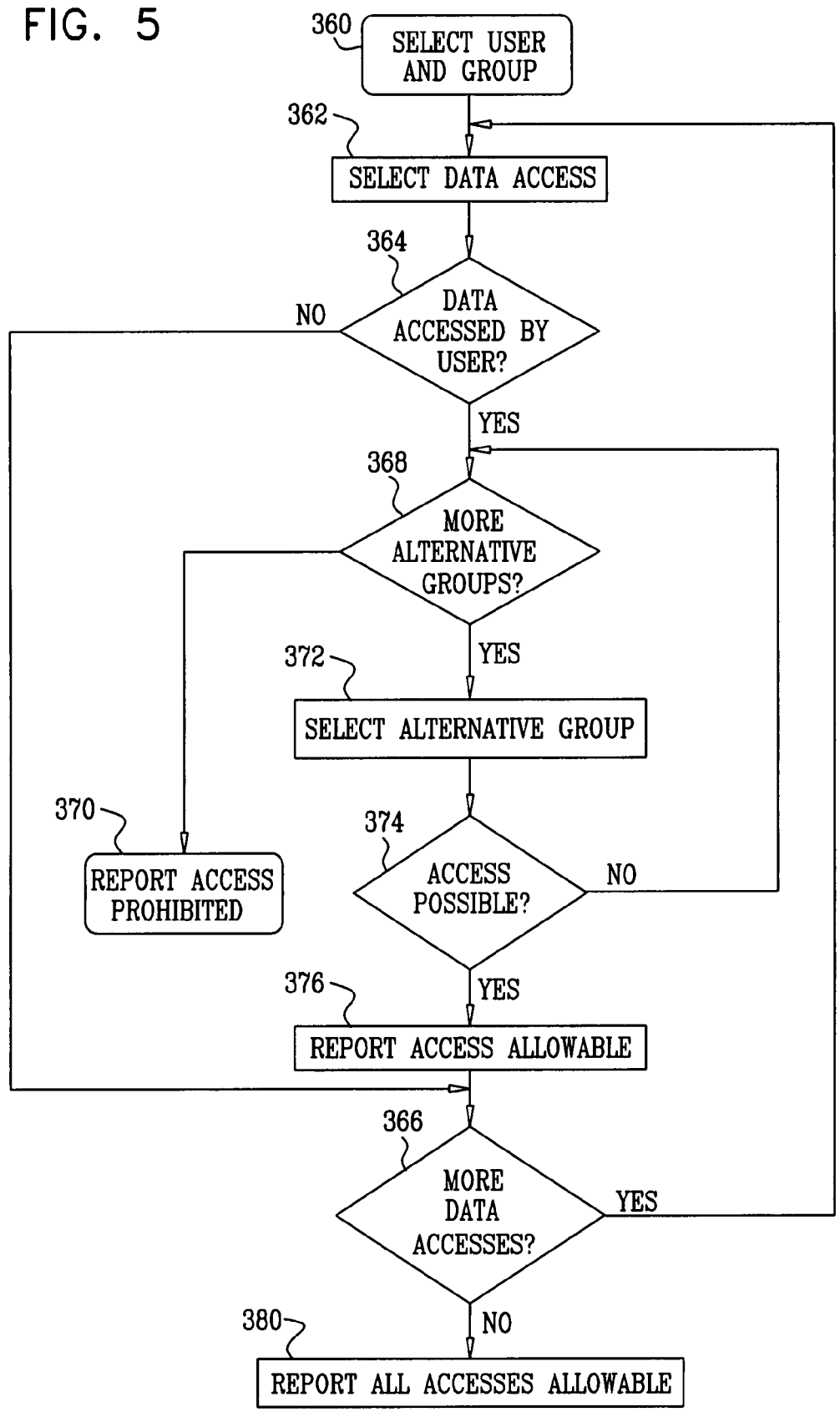
FIG. 5 is a flow chart of a method for determining if a proposed removal of a user from a user groups would prevent a repetition of historical data accesses, in accordance with a disclosed embodiment of the invention.

Reference is now made to FIG. 5, which is a flow chart of a method for determining if a proposed removal of a user from a user group would prevent the user from repeating historical data accesses to storage elements in a file system, in accordance with a disclosed embodiment of the invention. This method provides the operator with additional information, thereby improving the quality of a decision to implement or reject the proposal. It is assumed that a record of historical data accesses by users of the file system has been compiled. In addition to the use of an aggregated table, as described above, the record of actual accesses may be prepared using known techniques that optimize information retrieval according to users, for example by compiling user-specific files, or by the use of hash tables to deal with many users.

At initial step 360, a proposal is defined to remove a user from a selected user group having group data access privileges to a portion of the data elements of the file system. It is understood that in the event the current user is a set of users, e.g., itself a user group, initial step 360 is iterated for each member of the set. Multiprocessor implementations and the use of concurrent processes to efficiently accomplish this, and to implement recursive operations will occur to those skilled in the art.

Next, at step 362, a historical data access is selected from a record of such accesses. The order of this selection is not critical. The selection may comprise an entry of an aggregated table, as described above with reference to FIG. 2, or may involve the use of a hash table. Alternatively, the selection may be made simply by serially accessing a log file containing data accesses of some or all users.

Control now proceeds to decision step 364, where it is determined if the current data access selection relates to the subject user. If the determination at negative, then control proceeds to decision step 366, which is described below.

If the determination at decision step 364 is affirmative, then control proceeds to decision step 368, in which it is determined if the user's privileges by virtue of membership in an alternate user group need to be considered. This step is performed identically to decision step 335 (FIG. 4).

If the determination at decision step 368 is negative, then control proceeds to final step 370. It is concluded that access to the currently selected data element would be prohibited, as it cannot be accessed via any alternate user group to which the user belongs. Thus the user would not be able to repeat data accesses that he had executed in the past if the proposal is implemented. A report is prepared for the operator, and the procedure ends. If desired, the procedure can be repeated to evaluate the extent of loss of the user's historical access rights by reverting to step 362 and evaluating the remaining historical data accesses.

If the determination at decision step 368 is affirmative, then control proceeds to step 372. An alternate user group is selected. Step 372 is identical to step 345 (FIG. 4).

Control now proceeds to decision step 374, where it is determined whether members of the current alternative group have access to the currently selected data element. If the determination at decision step 374 is negative, then control returns to decision step 368 to consider the possibility of user access via another alternate user group. Decision step 374 is performed in the same manner as decision step 350 (FIG. 4).

If the determination at decision step 374 is affirmative, then at step 376 an indication that the current access remains allowable is stored and optionally immediately reported to the operator.

Control now passes to decision step 378, where it is determined if more data accesses remain to be evaluated.

If the determination at decision step 366 is affirmative, then control returns to step 362.

If the determination at decision step 378 is negative, then control proceeds to final step 380. The user has been determined to retain access rights to all its historically accessed data elements. A report is prepared for the operator indicating that all historical accesses of the user are allowable, and the procedure terminates.

Figure 6:
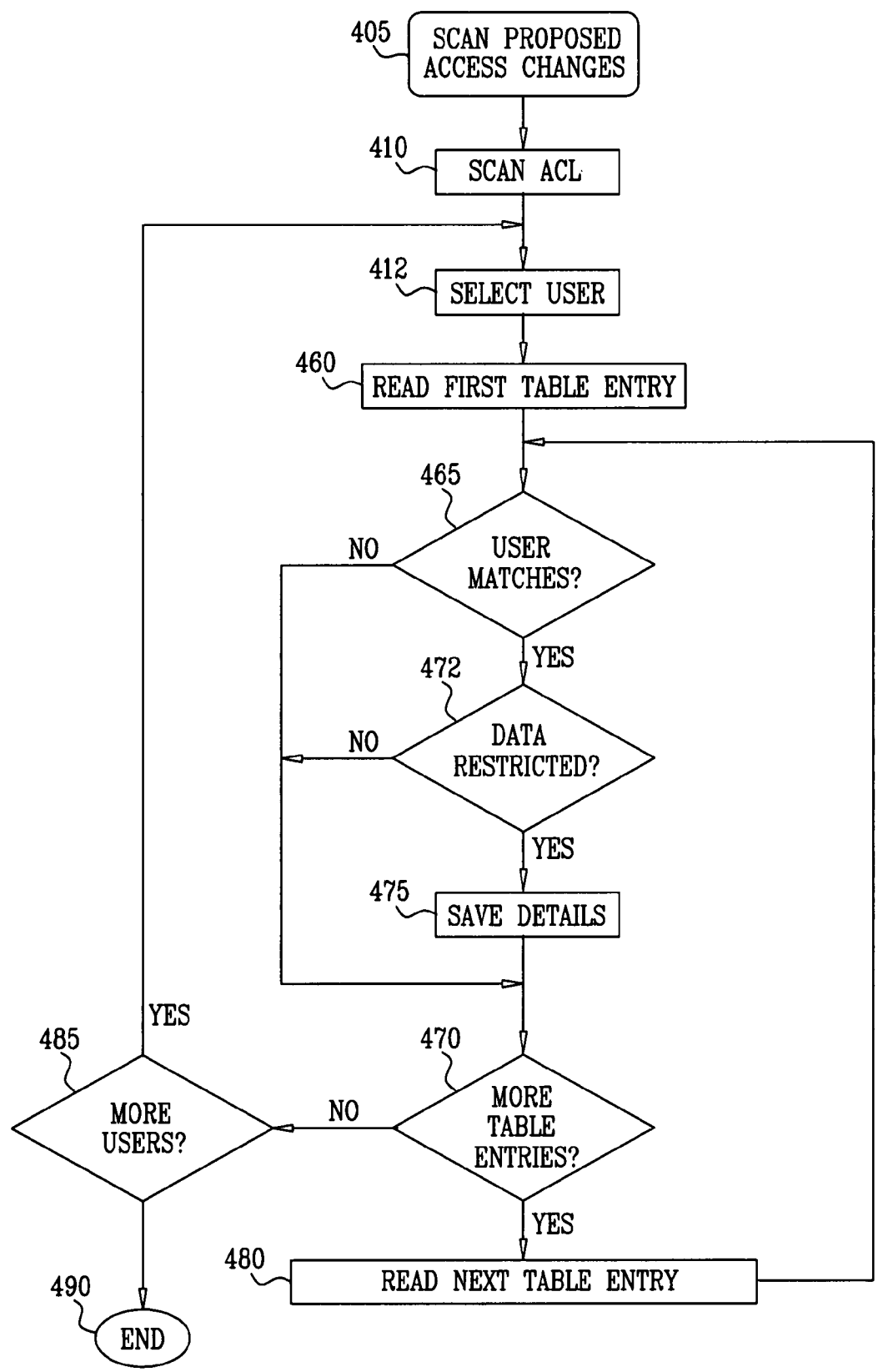
FIG. 6 is a detailed flow chart of a method for determining if a proposed removal of a user from a user group would prevent a repetition of historical data accesses, in accordance with a disclosed embodiment of the invention.

Reference is now made to FIG. 6, which is a detailed flow chart of a method for verifying that a proposed removal of a user from a user group would not prevent the user from repeating historical data accesses, in accordance with an alternate embodiment of the invention. The method is described with reference to the embodiment of FIG. 1.

At initial step 405, the administrator 40 uses the GUI application 45 to specify a set of proposed removals of users from user groups, as described above with reference to FIG. 4.

The GUI application 45 scans the set of proposed changes, and produces a set of groups and users affected by the changes.

Next, at step 410, the GUI application 45 (FIG. 1) scans the ACL 20, for the affected groups and converts each group into a set of users in that group (this may be recursive for groups within the group), to obtain a complete set of users affected by the proposed removals of users from user groups.

Next, at step 412, a user not previously selected is selected from the set of affected users.

Next, at step 460, a historical access is identified. In the embodiment of FIG. 1, this can be done by reading the first table entry 152 (FIG. 2) of the aggregated table 55 (FIG. 2) is read. In an alternative embodiment, a log entry 110 (FIG. 2) of the log file 24 (FIG. 2) may be used instead.

Next at decision step 465, it is determined whether the field 154 (FIG. 2) in the current table entry 152 (FIG. 2) matches the user selected at step 412.

If the determination at decision step 465 is negative, control proceeds to decision step 470, described below.

If the determination at decision step 465 is affirmative, control proceeds to decision step 472. Referring again to FIG. 2, it is determined whether residual access permissions, remaining after the proposed removals of users from user groups, would still allow the user referenced by the field 154 in the current table entry 152 to access the data referenced by the field 156 in the current table entry 152.

Referring again to FIG. 4, if the determination at decision step 472 is negative, control proceeds to decision step 470.

If the determination at decision step 472 is affirmative, control proceeds to step 475. The GUI application 45 stores the contents of the current table entry 152 (FIG. 2), for subsequent output to the administrator 40 in a graphical format at the end of the procedure. Additionally or alternatively, the details may be output at this step.

Next, at decision step 470, it is determined whether there are additional table entries 152 (FIG. 2) to be processed for the current user.

If the determination at decision step 470 is affirmative, control proceeds to step 480. The next table entry 152 (FIG. 2) is read and control returns to decision step 465.

If the determination at decision step 470 is negative, control proceeds to decision step 485. A determination is made if there are more users in the set of affected users who have not yet been selected.

If the determination at decision step 485 is affirmative, control returns to step 412.

If the determination at decision step 485 is negative, control proceeds to a final step 490. The GUI application 45 displays the results of the procedure to the administrator 40 and the procedure terminates.

The information provided by the methods disclosed with reference to FIGS. 4-6 may be consolidated into a report for evaluation by the administrator 40, who is thus able to evaluate the effectiveness and any disadvantages of implementing the proposed removal of the user from the user group.

In some embodiments, the method disclosed with reference to FIG. 5 or FIG. 6 is only performed if the method disclosed with reference to FIG. 4 produces no errors.

Alternate Embodiment.

The previous embodiments have focused on the consequences of removing a user or group of users from a user group. In other embodiments, a system such as the system 10 (FIG. 1) is configured to respond to a proposal in which privileges to access specified data element, e.g., a directory, is to be removed from the scope of common privileges of a user group. Unlike the previously described proposals, the composition of the user group is to remain unchanged.

Figure 7:
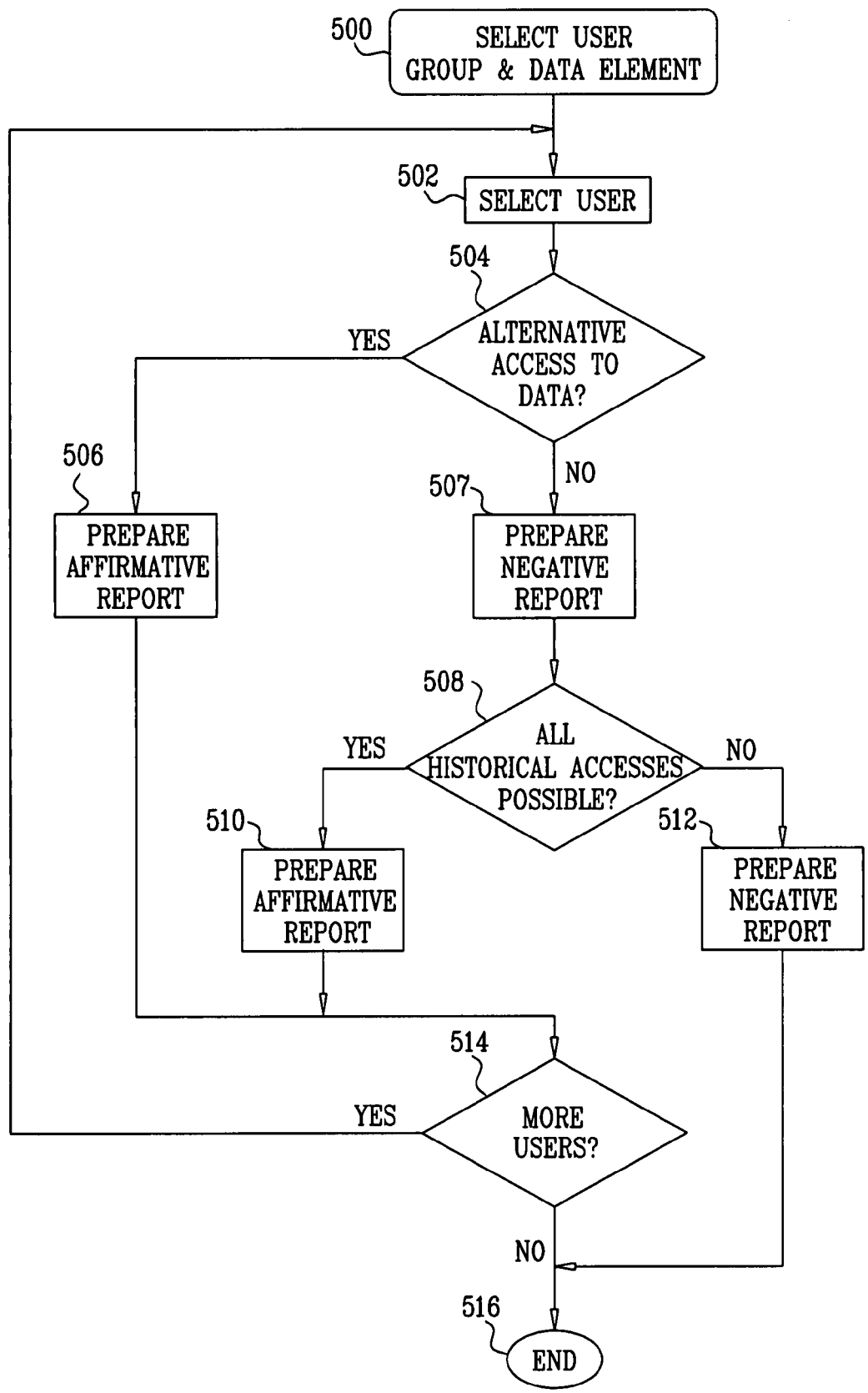
FIG. 7, is a flow chart of a method for verifying the effectiveness of a proposed removal of privileges of a user group to access a data element, in accordance with a disclosed embodiment of the invention.

Reference is now made to FIG. 7, which is a flow chart of a method for verifying the effectiveness of a proposed removal of privileges of a user group to access a data element, in accordance with a disclosed embodiment of the invention. It is assumed that a historical record of data accesses has been prepared as described above. At initial step 500 a user group and a data element are selected.

Next, at step 502 a user is selected from the user group. As noted above the user may itself be a set of users. Appropriate iteration and recursion are therefore applied.

Control now proceeds to decision step 504, where it is determined if the current user has alternative access to the data element that was designated in initial step 500. This determination is made by applying the method disclosed above with reference to FIG. 4, and compiling interim reports from the information stored in steps 340, 355 (FIG. 4).

If the determination at decision step 504 is affirmative, then an affirmative report is prepared at step 506. Control proceeds to decision step 514, which is described below. Alternatively, if decisional criteria require that no user in the group have alternative access to the data, the procedure could terminate at this point, in which case control would proceed directly to final step 516.

If the determination at decision step 504 is negative, then a negative report is prepared at step 507. Control proceeds to decision step 508. Here it is determined if the current user would still be able to perform all the historical accesses that were recorded. This determination is made by applying the method disclosed in FIG. 5.

If the determination at decision step 508 is affirmative, then control proceeds to step 510. An affirmative report is prepared based on the data stored in step 380 (FIG. 5). Control proceeds to decision step 514, which is described below.

If the determination at decision step 508 is negative, then control proceeds to step 512. At least one historical access performed by the current user would no longer be possible. A negative report is prepared based on the information recorded in step 376 (FIG. 5). Control proceeds to final step 516, and the procedure terminates.

At decision step 514 it is determined if there are more users to be evaluated who are members of the designated user group. If the determination at decision step 514 is affirmative, then control returns to step 502 to iterate the method with a new user.

If the determination at decision step 514 is affirmative, then control proceeds to final step 516.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method of eliminating membership of a person in a user group which has access permissions to storage elements in an enterprise, the method comprising:

initially specifying by a computer a proposed person and a proposed user group in which said proposed person is a member, wherein membership of said proposed person in said proposed user group is proposed to be eliminated;

thereafter ascertaining actually accessed storage elements which were actually accessed by said proposed person in the past;

thereafter for each of said actually accessed storage elements, ascertaining which authorized user groups have access permissions thereto;

thereafter ascertaining in which of said authorized user groups said proposed person has membership;

thereafter for each of said actually accessed storage elements, ascertaining that said person has membership in at least one of said authorized user groups having access permissions thereto, other than said proposed user group; and proceeding to eliminate said membership of said proposed person in said proposed group, only if each of said actually accessed storage elements has access permissions thereto from said at least one of said authorized user groups in which said person has membership, other than said proposed user group.

2. The method of claim 1, wherein each of said storage elements comprises:

a first directory; and all files and directories below said first directory in a hierarchy of files and directories.

3. The method of claim 1, wherein said step of initially specifying a proposed person and a proposed user group is performed automatically.

4. The method of claim 1, further comprising generating an error indication if at least one of said actually accessed storage elements does not have permissions thereto from said at least one of said authorized user groups in which said person has membership, other than said proposed user group.

5. A system for eliminating membership of a person in a user group which has access permissions to storage elements in an enterprise, the system comprising:

at least one processing device that is adapted to perform each of the following functionalities;

proposed person and proposed user group specifying functionality operative for initially specifying a proposed person and a proposed user group in which said proposed person is a member, wherein membership of said proposed person in said proposed user group is proposed to be eliminated;

storage element actual access ascertaining functionality operative for ascertaining actually accessed storage elements which were actually accessed by said proposed person in the past;

user groups access permissions ascertaining functionality operative for ascertaining, for each of said actually accessed storage elements, which authorized user groups have access permissions thereto;

user groups membership ascertaining functionality operative for ascertaining in which of said authorized user groups said proposed person has membership;

storage element access permissions ascertaining functionality operative for ascertaining, for each of said actually accessed storage elements, that said person has membership in at least one of said authorized user groups having access permissions thereto, other than said proposed user group; and membership elimination functionality operative for eliminating said membership of said proposed person in said proposed group, only if each of said actually accessed storage elements has access permissions thereto from said at least one of said authorized user groups in which said person has membership, other than said proposed user group.

6. The system of claim 5, wherein each of said storage elements comprises:

a first directory; and all files and directories below said first directory in a hierarchy of files and directories.

7. The system of claim 5, further comprising error indication generating functionality operative for generating an error indication if at least one of said actually accessed storage elements does not have permissions thereto from said at least one of said authorized user groups in which said person has membership, other than said proposed user group.

* * * * *